United States Patent [19]

Ballman

[11] 4,383,212
[45] May 10, 1983

[54] BATTERY CHARGER CONTROL DEVICE WITH D-C DISCONNECT AND A-C INTERRUPT

[76] Inventor: Gray C. Ballman, 30 Portland Dr., Frontenac, Mo. 63131

[21] Appl. No.: 168,056

[22] Filed: Jul. 14, 1980

Related U.S. Application Data

[63] Continuation-in-part of Ser. No. 914,408, Jun. 12, 1978.

[51] Int. Cl.³ .............................................. H02J 7/00
[52] U.S. Cl. ........................................ 320/30; 320/37; 320/39; 320/DIG. 2; 323/245; 323/902
[58] Field of Search ..................... 320/30, 37, 38, 39, 320/40, 6, DIG. 1, DIG. 2; 323/245, 902

[56] References Cited

U.S. PATENT DOCUMENTS

| | | | |
|---|---|---|---|
| 3,535,608 | 10/1970 | Cramer et al. | 320/6 X |
| 3,576,487 | 4/1971 | Chase | 320/39 |
| 3,652,916 | 3/1972 | Ballman | 320/40 X |
| 3,735,233 | 5/1973 | Ringle | 320/39 X |
| 3,748,568 | 7/1973 | Ackermann | 320/39 X |
| 3,781,631 | 12/1973 | Nelson et al. | 320/39 X |
| 3,867,681 | 2/1975 | Bishop et al. | 320/37 X |
| 3,886,427 | 5/1975 | Long | 320/37 X |
| 4,031,451 | 6/1977 | Gordon | 320/39 X |

Primary Examiner—R. J. Hickey

[57] ABSTRACT

A battery charger has a control circuit portion and a power circuit portion with common terminals to connect to a battery desired to be recharged, the power circuit includes a transformer and rectifier to deliver at least partially rectified A-C current to the battery, and an A-C power connection through which A-C power is supplied to the power circuit with the control circuit having a solid state switch to selectively connect the A-C power to the power circuit portion. The control circuit portion of the charger has a D-C disconnect feature which senses the interruption in the electrical circuit between the charger's terminals and the battery, said disconnect feature causing the operation of the A-C power switching device to disconnect the A-C power from the power circuit after the terminals have been disconnected. A further feature is an A-C interrupt feature which senses the disconnection or interruption of A-C power from the power circuit, latches the A-C power turn off control in its off condition, interrupts the voltage following and timing charge control and maintains it in readiness for resumption of the charging cycle, at the interrupted point in the cycle, after the A-C power has been restored.

10 Claims, 1 Drawing Figure

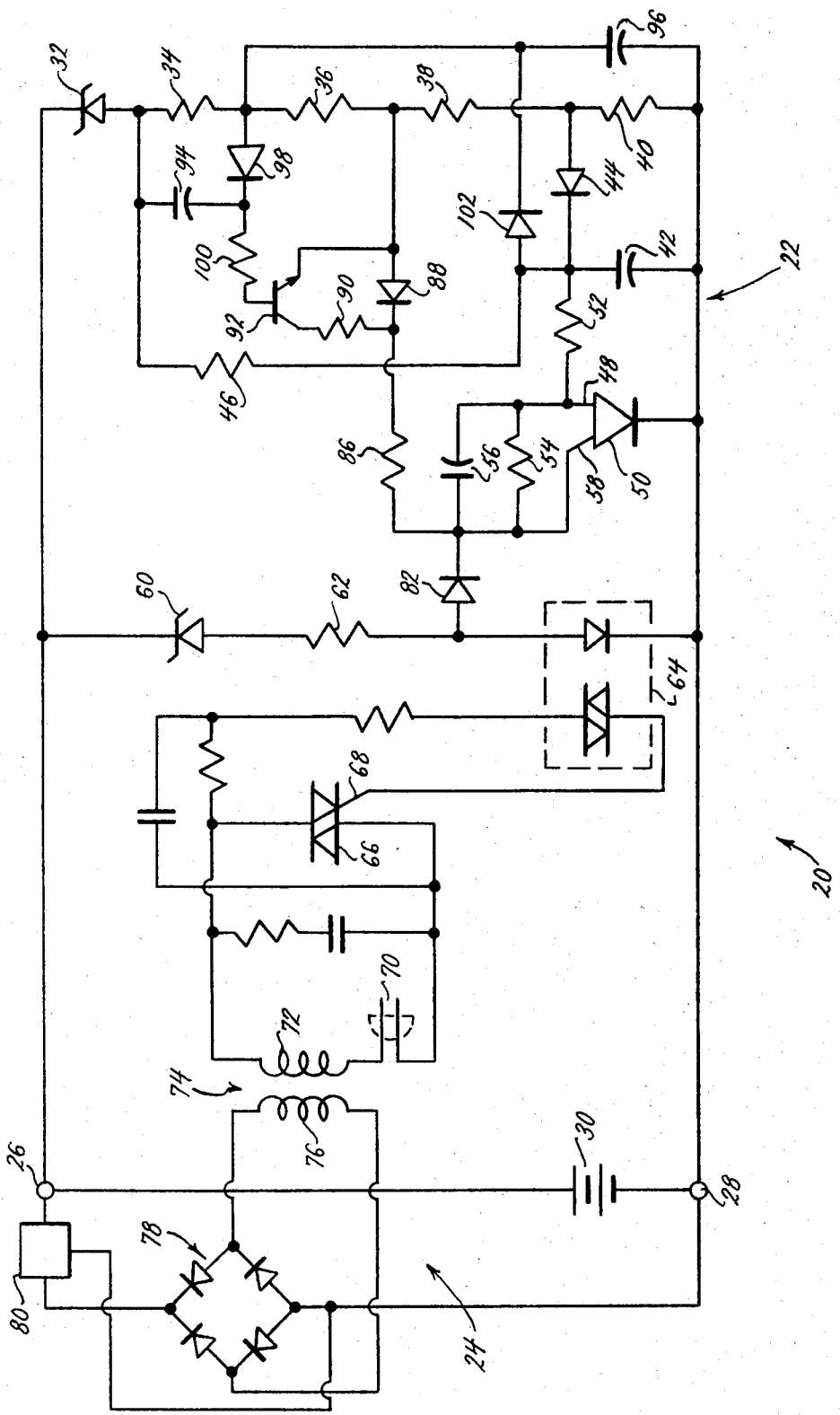

BATTERY CHARGER CONTROL DEVICE WITH D-C DISCONNECT AND A-C INTERRUPT

BACKGROUND AND SUMMARY

This application is a continuation-in-part of Ser. No. 914,408, filed June 12, 1978, the claims of which have been allowed.

Applicant's prior application discloses a battery charger control device which automatically turns on when a battery is connected across the control terminals and has a voltage following circuit which follows the battery voltage. A timing circuit automatically takes over control after the battery has achieved its end-of-charge terminal voltage and applies a measured over-charge before shutting off the charger. Applicant's prior invention represents a significant improvement over the prior art and is a valuable and useful invention.

As battery chargers and the work of recharging batteries is usually handled by maintenance people and others who lack the sophisticated training of engineers and the like, and for the further reason that battery chargers are subject to abuse, it is desirable to "idiot proof" battery chargers and eliminate the possibility of damage to them, the batteries, and their operators through misconnection, improper disconnection, and improper operation of the charger's controls. Furthermore, it is also desirable to optimize the amount of energy required to recharge any particular battery by adapting the charger for use at low peak energy periods, i.e. such as at night. As it is anticipated that the chargers would be unattended, especially at low peak energy hours, it is desirable for the control to be capable of withstanding interruptions of A-C service and to automatically resume charging where it left off after service is restored.

Applicant has succeeded in designing a battery charger control circuit which provides the many benefits and advantages of his prior patented design, and which also incorporates a D-C disconnect shut off feature and an A-C interrupt reset feature, heretofore unavailable. The D-C disconnect feature senses the disconnection of the battery charger from the battery before completion of the charging and automatically shuts off the battery charger by interrupting the flow of charging current to the battery charger terminals. In prior art designs, the charger is connected to the battery and continues to supply current until the end of the charging cycle, or until the charger is disconnected from its A-C supply. Should an operator incorrectly determine that the battery has reached a fully charged condition, or desire to use the battery before the charger has completed its cycle and turned itself off, he would disconnect the terminals from the battery. However, the full charging power would remain available at these terminals until a charger completed its timed cycle, representing a possibly dangerous condition. With applicant's new design, once the charger's positive and negative terminals are removed from the battery, the charging power is interrupted and the charger is shut down, removing any possibility of damage to the charger or damages to the operator. This feature is called a D-C disconnect feature.

Another feature which applicant has succeeded in incorporating into his prior design is an A-C interrupt and reset. Should the A-C power to the battery charger be interrupted through the A-C supply plug being disconnected or by a loss of A-C power at the charging site, the control circuit interrupts the voltage following and timing circuit and also locks the switching control for end of cycle charger turn off in an off or ready condition. When the A-C power is restored, the voltage following circuit quickly builds up to the battery voltage and reconnects the switching control, thereby resuming the charging procedure from the charge level the battery had attained before A-C power interruption occurred. This prevents battery undercharge or overcharge and also provides for unattended battery charger operation through the day or during low peak usage hours such as in the evening or on the weekends.

Applicant's new design for his battery charger control which incorporates these new features is more fully explained and described in the drawings and preferred embodiment which follows.

BRIEF DESCRIPTION OF THE DRAWINGS

FIG. 1 is an electrical schematic diagram of applicant's battery charger.

DETAILED DESCRIPTION OF THE PREFERRED EMBODIMENT

Applicant's battery charger 20 includes a control circuit portion 22 and a power circuit portion 24, both of which have outputs connected to positive terminal 26 and negative terminal 28 for connection to battery 30. A first Zener diode 32 is in series with four resistors 34, 36, 38, 40 which form a voltage divider circuit to generally follow the voltage of battery 30 as it gradually increases during charging. Timing capacitor 42 is connected in parallel with resistor 40 through diode 44 and in series with timing resistor 46 to provide a timed overcharge, as will be explained in greater detail hereinafter. The output of capacitor 42 is applied to the anode 48 of programmable unijunction transistor (PUT) 50 through resistor 52. A resistor 54 and capacitor 56 are connected in parallel between the anode 48 and gate 58 of PUT 50.

A second Zener diode 60 is connected to positive terminal 26 and is in circuit with resistor 62 and the control side of opto-coupler 64. Opto-coupler 64 interfaces between the control circuit 22 and power circuit 24 and controls triac 66 through its gate terminal 68 to switch the A-C power received through A-C plug 70. When the triac 66 is switched closed, A-C power flows through the primary 72 of transformer 74, thereby energizing it and the secondary 76. A full wave bridge 78 rectifies the A-C output from the secondary 76 and is filtered by filter network 80 to deliver a generally smooth D-C charging current and voltage with an A-C ripple component.

A diode 82 connects between the common terminal of resistor 62 and opto-coupler 64 with gate terminal 58 of PUT 50 and, through resistor 54 and capacitor 56, to anode 48. Thus, as PUT becomes conductive the current through opto-coupler 64 is diverted away through diode 82, resistor 54, and PUT 50 which turns off opto-coupler 64 and shuts down the power circuit 24. Gate terminal 58 is connected through resistor 86 and diode 88 to the common terminal of resistors 36 and 38. Diode 88 is by-passed through resistor 90 and transistor 92 with the biasing for transistor 92 provided by capacitors 94, 96, diode 98 and resistor 100. Diode 102 provides a discharge path for capacitor 42 through resistors 36, 38, and 40 during A-C interrupt, as explained supra.

DESCRIPTION OF OPERATION

As can be seen by comparing the drawings of applicant's present device with that as shown in his prior patent, many of the same components are used to provide the same function and benefits as shown in that patent. Applicant will now generally describe the basic operation of the charger for purposes of understanding the operation of the additional features contained in applicant's new circuit design. To charge a battery, applicant's battery charger 20 is connected to a battery 30 as shown in the drawing. The positive terminal 26 and negative terminal 28 are connected and the A-C plug 70 is connected to a suitable source of A-C power having a nominal voltage of 120 volts A-C. The Zener diode 60 is chosen so that the battery voltage places it in conduction, thereby permitting current flow through resistor 62 and opto-coupler 64. Opto-coupler 64 energizes triac 66 to switch on the A-C power to the transformer 74. Charging current is thereby supplied to the battery 30 through the positive and negative terminals 26, 28.

Similarly, Zener diode 32 is chosen so that it goes into conduction as the battery is connected and it has a somewhat higher voltage rating so that a smaller voltage is impressed across the resistor bridge or divider network comprised of resistors 34–40. The voltage at the common connection point between resistors 36 and 38, as reduced by resistor 86 is impressed upon the gate 58 of PUT 50. At the same time, the voltage at the common connection point between resistors 38 and 40 is impressed on the timing capacitor 42 and also on the anode 48 of PUT 50 as reduced by resistor 52. A parallel circuit through resistor 46 is also connected to capacitor 42, but its value is much larger than the resistors 36–40, resulting in a much longer time constant. However, the circuit through resistor 46 has a higher end voltage. Diode 44 permits capacitor voltage 42 to follow the faster voltage build up through the resistor network 34–40 until it is overtaken by the voltage build up through resistor 46, which reverse biases diode 44 and isolates capacitor 42 from the resistor network. Thus, the anode voltage of PUT 50 can be controlled and remain proportional to the gate voltage while the battery voltage is rising. When the battery voltage levels off, the circuit through resistor 46 provides a timed overcharge before PUT 50 is fired to turn the charger 20 off.

To achieve charger turn off at the end of the charge cycle, PUT 50 must be biased into conduction by raising anode 48 voltage $+\frac{1}{2}$ volt above gate 58 voltage. Firing of PUT 50 provides an alternate path for current through diode 82, diverting current away from the opto-coupler 64 and thereby disconnecting the A-C voltage to the power transformer 74. Thus, PUT 50 serves as an end of cycle switch. The operation of the circuit heretofore described is essentially as shown and described in applicant's prior patent.

D-C Disconnect

This circuit feature provides for an automatic shutting down of the charger 20 if the positive terminal 26, or both positive and negative terminals 26, 28 are removed from battery 30 before the charging cycle is completed. As explained above, both the control circuit 22 and the power circuit 24 are connected to terminals 26, 28; as is battery 30. Thus, disconnection of terminals 26, 28 from battery 30 does not entirely remove voltage from the control circuit 22 as power circuit 24 has an output voltage which is independent of battery 30. The voltage output from power circuit 24 is rectified A-C and includes a ripple component of A-C. While battery 30 is connected, this A-C ripple voltage can never drive the voltage between terminals 26, 28 below the battery voltage. Once disconnected, however, terminal 26, 28 voltage is no longer supported by the D-C bias of battery 30 and the ripple voltage defines the instantaneous voltage.

Opto-coupler 64 which controls the switching of triac 66 (and thus A-C power) is energized by current flowing through Zener diode 60. If properly chosen, the voltage rating of Zener 60 is such that as the ripple voltage decreases, Zener 60 goes into non-conduction for a sufficient time period during a valley of ripple voltage to turn off the A-C power before the ripple voltage rises sufficiently to push Zener 60 back into conduction. As a result, the A-C power is turned off almost instantaneously should terminals 26, 28 be removed from the battery 30 before completion of the charging cycle.

A-C Interrupt

This feature compensates for the temporary loss of A-C power by interruption of the A-C supply or improper disconnection of the A-C plug 70 by suspending the charging cycle and latching the charger 20 on for resumption of charging immediately upon restoration of A-C power.

At the end of each charging cycle, PUT 50 fires to turn off the A-C power and discharge the timing capacitor 42 in preparation for the next charging cycle. This must be prevented if the charging cycle is to resume from its point of interruption.

In applicant's present design, A-C ripple from power circuit 24 biases transistor 92 into conduction and thereby completes the circuit through resistor 90 around diode 88. As current must flow out of gate 58 for PUT 50 to fire, such as at the end of the charging cycle, transistor 92 must be on to provide a gate current path. Should the A-C plug 70 be pulled, or the A-C supply otherwise interrupted to power transformer 74, thereby eliminating the ripple voltage, transistor 92 turns off which latches PUT 50 into its non-conducting mode. With the charging current disconnected from the battery 30, the voltage across positive and negative terminals 26, 28 drops to the battery voltage which is something less than the charging voltage output from the power circuit 24. As the voltage across capacitor 42 is following the charging voltage through diode 44, interruption of the charging current causes diode 102 to be forward biased and creates a discharge path through diode 102, resistors 36, 38, and 40 to bring capacitor voltage 42 down to a percentage of the steady state battery voltage and latch it at that voltage. Zener diode 60 remains in its conducting state and there is sufficient current through resistor 62 to maintain opto-coupler 64 and triac 66 latched on. Thus, when the A-C power has been interrupted, the PUT 50 is locked in its non-conducting state awaiting return of A-C power; timing capacitor 42 is discharged to a portion of the steady state battery voltage and is latched at that voltage through diode 102.

When the A-C power is restored, diode 102 becomes reverse biased as voltage builds up through the resistor divider circuit and diode 44 provides a path for recharging of capacitor 42 as the battery quickly returns to a voltage level approximating that it had attained before power was interrupted. Reverse biasing of diode 102 also isolates resistor 46 from the resistor bridge and recreates the RC timing circuit with capacitor 42 to continue the timed accumulation of charge necessary for the overcharging feature. The ripple voltage also turns on transistor 92 to once again provide a path for current flow out of gate 58 as required to turn on PUT 50 at the end of the charging cycle.

Various changes and modifications to applicant's invention would be apparent to those of ordinary skill in the art. Applicant has disclosed his preferred embodiment as an illustration of his invention but he intends that the scope of his invention be limited only by the scope of the claims appended hereto.

What is claimed is:

1. A battery charger having positive and negative terminals to connect to a battery desired to be recharged, the battery charger having an electronic control circuit with connections to said positive and negative terminals, a power circuit with connections to said positive and negative terminals, said power circuit having means to deliver at least partially rectified A-C current through said terminals and to said battery, an A-C power connector through which A-C power is supplied to said power circuit, said control circuit having means to switch said A-C power to disconnect A-C power from the power circuit, said A-C power switching means having a control lead, a diode connected between said positive terminal and the control lead of said A-C power switching means, said A-C power switching means including an electronic switch means in circuit with said diode, said rectified A-C current having a sufficient A-C component so that its instantaneous voltage drops below the conduction voltage of said diode so that if the battery is disconnected from the positive terminal, the diode goes into a non-conductive state thereby causing said electronic switch means to switch off to disconnect said A-C power from said power circuit, thereby shutting off said battery charger.

2. A battery charger having positive and negative terminals to connect to a battery desired to be recharged, the battery charger having an electronic control circuit with connections to said positive and negative terminals, a power circuit with connections to said positive and negative terminals, said power circuit having means to deliver at least partially rectified A-C current through said terminals and to said battery, an A-C power connector through which A-C power is supplied to said power circuit, said control circuit having means to switch said A-C power, means to establish a first voltage proportional to the changing voltage of the battery as it is charged, means to switch off said charger when said first voltage reaches a predetermined value corresponding to a fully charged batter, means to sense loss of A-C power from said A-C power connector, means to adjust said first voltage to a value proportional to the remaining battery voltage, means to readjust said first voltage to its previous value upon regaining A-C power, said control circuit thereby resuming the charging cycle from the point of interruption thereof the control circuit including a timing circuit to provide a measured overcharge after the battery has attained a predetermined voltage, and an end of cycle switch for operating the A-C power switch at the end of the charging cycle, said first voltage means having means to disable said timing circuit and said control circuit including means to disable said end of cycle switch and latch it in its charge condition to prevent charger turn off upon interruption of A-C power.

3. The battery charger of claim 1 further comprising means to sense the loss of A-C power from said A-C power connector, means to suspend the charging cycle until restoration of said A-C power, and means to resume charging from the point in the charging cycle at which A-C power loss was sensed.

4. The device of claim 1 or 3 wherein said diode is a Zener diode and said electronic switch means includes an opto-coupler.

5. The device of claim 4 wherein said A-C power switching means includes a triac in circuit with said opto-coupler.

6. The device of claim 3 wherein the control circuit includes a timing circuit to provide a measured overcharge after the battery has attained a predetermined voltage, and an end of cycle switch for operating the A-C power switch at the end of the charging cycle, said first voltage means having means to disable said timing circuit and said control circuit including means to disable said end of cycle switch and latch it in its charge condition to prevent charger turn off upon interruption of A-C power.

7. The device of claim 6 wherein the end of cycle switch disabling means includes a transistor biased into conduction by the presence of A-C ripple voltage at the positive terminal, the end of cycle switch having a gate, said transistor connected in series with said gate so that said transistor must be in conduction for said gate to trigger said end of cycle switch.

8. The device of claim 7 wherein said transistor is connected in parallel with a blocking diode, said diode impressing a voltage from said first voltage means on said gate when said transistor is in a non-conductive state.

9. The device of claim 7 wherein the end of cycle switch is a programmable unijunction transistor (PUT), and the A-C power switch includes an opto-coupler.

10. A battery charger having positive and negative terminals to connect to a battery desired to be recharged, the battery charger having an electronic control circuit with connections to said positive and negative terminals, a power circuit with connections to said positive and negative terminals, said power circuit having means to deliver at least partially rectified A-C current through said terminals and to said battery, an A-C power connector through which AC power is supplied to said power circuit, said control circuit having means to switch said A-C power, means to establish a first voltage proportional to the changing voltage of the battery as it is charged, the first voltage means including a timing capacitor, means to switch off said charger when said first voltage reaches a predetermined value corresponding to a fully charged battery, means to sense loss of A-C power from said A-C power connector, means to adjust said first voltage to a value proportional to the remaining battery voltage, means to readjust said first voltage to its previous value upon regaining A-C power, said control circuit thereby resuming the charging cycle from the point of interruption thereof, the first voltage adjusting means including a diode which forward biases upon interruption of A-C power to connect said timing capacitor in series with at least one resistor.

* * * * *